US012574533B2

(12) United States Patent
Feder et al.

(10) Patent No.: US 12,574,533 B2
(45) Date of Patent: Mar. 10, 2026

(54) PROCESSING SENSOR DATA IN A CONTROL DEVICE BY MEANS OF LOSSY COMPRESSION

(71) Applicant: Robert Bosch GmbH, Stuttgart (DE)

(72) Inventors: Andreas Feder, Leonberg (DE); Bane Strahinjic, Leonberg (DE); Claus Spizig, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/691,552

(22) PCT Filed: Aug. 4, 2022

(86) PCT No.: PCT/EP2022/071922
§ 371 (c)(1),
(2) Date: Mar. 13, 2024

(87) PCT Pub. No.: WO2023/046346
PCT Pub. Date: Mar. 30, 2023

(65) Prior Publication Data
US 2024/0380905 A1    Nov. 14, 2024

(30) Foreign Application Priority Data
Sep. 21, 2021    (DE) .................... 10 2021 210 494.0

(51) Int. Cl.
*H04N 19/20*        (2014.01)
*G06V 20/58*        (2022.01)
*H04N 17/00*        (2006.01)

(52) U.S. Cl.
CPC ............. *H04N 19/20* (2014.11); *G06V 20/58* (2022.01); *H04N 17/002* (2013.01)

(58) Field of Classification Search
CPC ....... H04N 19/20; H04N 17/002; G06V 20/58
See application file for complete search history.

(56) References Cited

U.S. PATENT DOCUMENTS

2019/0287024 A1    9/2019    Briggs et al.
2020/0304804 A1*   9/2020    Habibian ............... H04N 19/13

FOREIGN PATENT DOCUMENTS

DE        102019214587 A1     3/2021

OTHER PUBLICATIONS

International Search Report for PCT/EP2022/071922, Issued Nov. 29, 2022.

* cited by examiner

*Primary Examiner* — Yassin Alata
(74) *Attorney, Agent, or Firm* — NORTON ROSE FULBRIGHT US LLP

(57)        ABSTRACT

A method for processing sensor data in a control device using lossy compression. The method includes: receiving the sensor data in the control device, wherein the sensor data have been provided by a sensor system for capturing an environment of a vehicle; compressing the sensor data in a lossy compression method in order to obtain compressed sensor data; decompressing the compressed sensor data in order to obtain decompressed sensor data; and inputting the decompressed sensor data as input data into an object detection algorithm, which is configured to convert the input data into output data which display objects in the environment of the vehicle.

3 Claims, 2 Drawing Sheets

PROCESSING SENSOR DATA IN A CONTROL DEVICE BY MEANS OF LOSSY COMPRESSION

FIELD

The present invention relates to a method for processing sensor data in a control device by means of lossy compression, and to a control device for carrying out this method. In addition, the present invention relates to a method for evaluating a lossy compression method for use in such a control device, to a computer program for carrying out one or both of the aforementioned methods and to a computer-readable medium on which such a computer program is stored.

BACKGROUND INFORMATION

For testing image processing algorithms, such as are used for object detection within the context of partially or fully automated driving, large volumes of recorded image data are generally required, which can be provided by a number of different vehicles in different driving situations. In addition, artificial sequences can be used. Correspondingly high costs can be incurred for storing, transmitting and processing such data.

In order to reduce the volume of data, the image data can be compressed in a lossless compression method, for example, by a measuring PC or data logger connected to the corresponding sensor system. For training, validating or testing the image processing algorithm, the decompressed image data can then be used, which, due to the lossless compression, are identical to the uncompressed output data. However, in this way the data volume can only be reduced by about 40% to 60%.

SUMMARY

The present invention provides a method for processing sensor data in a control device by means of lossy compression, a method for evaluating a lossy compression method, a corresponding control device, a corresponding data processing device, a corresponding computer program, and a corresponding computer-readable medium. Advantageous developments and improvements of the present invention result from the disclosure herein.

Embodiments of the present invention make it possible to significantly reduce the volume of data in the development, optimization, and release of image processing algorithms as used, for example, for environment detection in the context of partially or fully automated driving. The costs associated therewith are thus significantly lower as compared to conventional approaches.

A first aspect of the present invention relates to a computer-implemented method for processing sensor data in a control device by means of lossy compression. According to an example embodiment of the present invention, the method comprises at least the following steps: receiving the sensor data in the control device, wherein the sensor data have been provided by a sensor system for capturing an environment of a vehicle; compressing the sensor data in a lossy compression method via the control device or a circuit integrated in the control device in order to obtain compressed sensor data; decompressing the compressed sensor data via the control device or a circuit integrated in the control device in order to obtain decompressed sensor data;

and evaluating the decompressed sensor data via the control device in order to detect objects in the environment of the vehicle.

The method can be carried out automatically by a processor of the control device.

The sensor data received in the control device can be output data to be compressed, in particular uncompressed output data, which are generated and output by the sensor system. The lossy compression method can be carried out, for example, by the processor of the control device. For example, the control device can comprise a separate hardware module for the compression and decompression, in particular a separate programmable hardware module on which a corresponding computer program can be stored. By carrying out the lossy compression method, irrelevant information can be irretrievably removed from the sensor data. This process can also be referred to as irrelevance reduction. The sensor data can thus no longer be fully reconstructed from the compressed sensor data. In other words, the decompressed sensor data may comprise different and/or less information than the original sensor data. Relative to the original sensor data, the compressed sensor data can be reduced in their volume of data by at least 40%, for example by at least 60%, in particular by at least 80%.

The vehicle can be a motor vehicle, for example in the form of a car, truck, bus, or a motorcycle. In the broader sense, a vehicle can also be understood to be an autonomous mobile robot. In the broader sense, the method could also be applied to sensors in production or in safety technology.

The sensor system can be, for example, a camera, a radar, lidar or ultrasonic sensor or a combination of at least two of these examples.

An object can be, for example, another vehicle, a pedestrian, a cyclist, a road marking or a road sign. However, an object can also be a line or edge in an image.

The control device can, for example, be configured to steer, accelerate, and/or brake the vehicle automatically on the basis of the sensor data. For this purpose, the vehicle can comprise a corresponding actuator system, for example in the form of a steering actuator, a brake actuator, an engine control device, an electric drive motor or a combination of at least two of these examples.

A second aspect of the present invention relates to a control unit. According to an example embodiment of the present invention, the control device comprises a processor configured to carry out the method described above and below for processing sensor data. The control unit can comprise hardware and/or software modules. In addition to the processor, the control unit can comprise a memory and data communication interfaces for data communication with peripheral devices. Features of the aforementioned method can also be features of the control device, and vice versa.

A third aspect of the present invention relates to a computer-implemented method for evaluating a lossy compression method for use in a control device, as described above and below. According to an example embodiment of the present invention, the method comprises at least the following steps: receiving sensor data in a data processing device, wherein the sensor data have been provided by a sensor system for capturing an environment of a vehicle; compressing the sensor data in the lossy compression method in order to obtain compressed sensor data, and/or receiving compressed sensor data, which have been provided by the control device by compressing the sensor data in the lossy compression method, in the data processing device; decompressing the compressed sensor data in order to obtain decompressed sensor data; inputting the sensor data and the decompressed sensor data as input data into an object detection algorithm that has been trained with recorded sensor data in order to convert the input data into output data which display objects in the environment of the vehicle; determining a deviation between the output data provided by the object detection algorithm by conversion of the sensor data and the output data provided by the object detection algorithm by conversion of the decompressed sensor data; and generating an evaluation for the lossy compression method on the basis of the deviation.

The term "object detection algorithm" can be understood above and below to mean, for example, an artificial neural network, a support vector machine, a k-means algorithm, a k-nearest-neighbor algorithm, a decision tree, a random forest, or a combination of at least two of these examples.

The recorded sensor data can be data which have not undergone lossy compression (in contrast to the decompressed sensor data). For example, the recorded sensor data may have been generated by recording the uncompressed sensor data provided by the sensor system. Alternatively, the recorded sensor data may have been generated by compression, in a lossless compression method, of the sensor data provided by the sensor system, and subsequent decompression of the losslessly compressed sensor data.

The recorded sensor data can comprise, for example, training data for training the object detection algorithm in a training step and/or validation data for validating the object detection algorithm in a validation step following a training step. The training data and the validation data can differ from one another in this case.

It is not absolutely necessary for the training data that were used for training the object detection algorithm in the data processing device to correspond to the training data that were used for training the object detection algorithm in the (real) control device. For example, the object detection algorithm in the data processing device can be trained with lossless data or with data compressed using a different lossy compression method than the one implemented in the control device. What is decisive is that the validation data that were used for validating the object detection algorithm in the data processing device correspond to the validation data that were used for validating the object detection algorithm in the (real) control device. In particular, the validation data should match insofar as they were compressed in the same lossy compression method.

The sensor data and the decompressed sensor data can, for example, be processed in parallel processes by the object detection algorithm.

A "data processing device" can be understood above and below to mean, for example, a server, a PC, a laptop, a tablet, a smartphone, an expansion card, for example an FPGA board, or a combination of at least two of these examples.

The control device and the data processing device can be interconnected in a wired and/or wireless manner for data communication via a data communication connection, for example via WLAN, Bluetooth, and/or mobile radio.

With the aid of such a method of the present invention, influences of the lossy compression method on the detection performance of the object detection algorithm can be determined directly without the need for additional comparison data, for example ground truth data. Such a comparison can be carried out, for example, in parallel with normal operation of the control device while the vehicle is traveling. This simplifies the adaptation of the lossy compression method with regard to optimal detection performance.

A fourth aspect of the present invention relates to a data processing device. According to an example embodiment of the present invention, the data processing device comprises a processor configured to execute the method described above and below for evaluating a lossy compression method. In addition to the processor, the data processing device can comprise a memory and data communication interfaces for data communication with peripheral devices. Features of the aforementioned method can also be features of the data processing device, and vice versa.

Further aspects of the present invention relate to a computer program and a computer-readable medium on which the computer program is stored.

The computer program comprises commands that cause a processor to carry out one or both of the methods described above and below when the computer program is executed by the processor.

The computer-readable medium can be a volatile or non-volatile data memory. For example, the computer-readable medium can be a hard disk, a USB memory device, a RAM, ROM, EPROM or flash memory. The computer-readable medium can also be a data communication network, such as the Internet or a data cloud, that allows a download of a program code.

Features of the methods of the present invention described above and below can also be features of the computer program and/or of the computer-readable medium, and vice versa.

Possible features and advantages of embodiments of the present invention can be regarded, inter alia, and without limiting the present invention, as being based on the concepts and findings described below.

According to one example embodiment of the present invention, the method for processing the sensor data can further comprise: transmitting the compressed sensor data and/or the output data from the control device to a data processing device for recording and/or evaluating the compressed sensor data and/or the output data. In this way, the efficiency of the data transmission and storage can be significantly increased compared to conventional approaches, according to which the sensor data are compressed losslessly or not at all.

According to one example embodiment of the present invention, when the control device is operated in a test mode, the method can further comprise: receiving recorded compressed sensor data, which have been compressed in the lossy compression method and/or in a lossy compression method to be tested, in the control device; decompressing the recorded compressed sensor data via the control device in order to obtain recorded decompressed sensor data; inputting the recorded decompressed sensor data into the object detection algorithm as the input data in order to test the control device. The compressed sensor data and the recorded compressed sensor data may have been compressed in the same lossy compression method or even in different lossy compression methods. The lossy compression method to be tested can differ from the lossy compression method (currently used in the control device). For example, the compression method to be tested can be an updated version of the currently used compression method. The recorded compressed sensor data can be based on sensor data originating from a single real vehicle or from a plurality of real vehicles, more precisely from their respective sensor systems. In other words, the recorded compressed sensor data may have been provided by a single control device or by a plurality of control devices of different vehicles. It is also possible that the recorded compressed sensor data were generated by a mathematical model that simulates physical properties of the sensor system, of the vehicle and/or of objects to be detected in the environment of the vehicle. The test mode can, for example, be used to check updated control device software for bugs or to train, validate and/or test an object detection algorithm, which runs on the control device, using the recorded decompressed sensor data. In this way, the release of new software versions for the control device can be simplified.

According to one example embodiment of the present invention, the decompressed sensor data can be input into an object detection algorithm which has been trained with recorded decompressed sensor data, in order to convert the input data into the output data. In this case, the recorded decompressed sensor data may have been generated by decompression of recorded compressed sensor data which were compressed in the lossy compression method. With the aid of such an object detection algorithm, object detection can be significantly improved.

According to one example embodiment of the present invention, the sensor system can be a camera and the sensor data can be image data provided by the camera. Tests have shown that video algorithms, such as those used for example for detecting traffic signs and other objects, achieve very good performance when combined with lossy video compression.

According to one example embodiment of the present invention, the decompressed sensor data can be obtained by the control device first compressing and then preprocessing the compressed sensor data. The preprocessing can comprise, for example, noise reduction, rectification, or exposure control. Alternatively or additionally, the compressed sensor data can be obtained by the control device first preprocessing and then compressing the sensor data provided by the sensor system. In this way, object detection can be further improved.

According to one example embodiment of the present invention, the control device can comprise a programmable module which is configured to compress the sensor data in the lossy compression method in order to obtain the compressed sensor data and/or to decompress the compressed sensor data in order to obtain the decompressed sensor data. The programmable module can, for example, be an FPGA or a system on a chip or SoC for short. However, it is also possible for the compression and/or decompression to be carried out by a graphics processor (GPU) or a digital signal processor (DSP). In this case, a computer program for evaluating the decompressed sensor data, for example a computer program encoding the object detection algorithm, can be stored in another area of the control device outside the programmable module. In this way, the compression and/or decompression can be flexibly adapted to different system configurations without the hardware of the control device needing to be modified.

The programmable module can be inserted for example directly after an image sensor and before an image processing chain in the control device. In this case, the module can be configured to compress video data and then to decompress them again, and these lossy decompressed video data can be evaluated by the control device. This is relevant in particular in connection with artificial neural networks, since even small differences in the characteristics of the images, which can arise as a result of lossy compression, can lead to different evaluation results. It can therefore be ruled out that differences in the evaluation results are due to the lossy compression.

The module can additionally comprise an interface for measuring and/or feeding in the lossy compressed sensor data. As a result, the sensor data no longer need to be separately compressed on a measuring system for storage, for example, and decompressed on a storage server for re-feeding. This additionally reduces the network load when measuring or feeding in the data and relieves the load on the overall system.

Alternatively, according to an example embodiment of the present invention, the compression and decompression of the recorded sensor data can also take place in the measuring and/or re-feed computer, for example by means of a special expansion card in a PC. In this case, it is expedient if the measuring and/or re-feed computer is equipped with the same module for (de-)compression as the control device.

According to one example embodiment of the present invention, the programmable module can be configured to first decompress and then preprocess the compressed sensor data in order to obtain the decompressed sensor data. In other words, a preprocessing function, for example an image preprocessing function for noise reduction, rectification and/or exposure control, can be integrated into the programmable module in addition to the compression and/or decompression function. In this way, the preprocessing can be flexibly adapted to different system configurations without the hardware of the control device needing to be modified or special test hardware being required.

According to one example embodiment of the present invention, the method for evaluating a lossy compression method can further comprise: generating control commands for controlling a recording of the sensor data on the basis of the deviation. The sensor data can be recorded in the data processing device, in the control device and/or in a data memory which is connected to the data processing device and/or to the control device for data communication, for example a central storage server. For example, recording the (uncompressed) sensor data or other additional data provided by the vehicle can be started automatically if the deviation is classified by the data processing device as relevant. Conversely, a recording in progress can be automatically interrupted if the deviation is re-classified by the data processing device as irrelevant.

An important point in the development, optimization and release of video algorithms is the feeding of recorded sensor data into an existing control device. For testing the algorithms used in the vehicle, previously recorded sequences can be fed back into the same control device as will be used later in the vehicle. As a rule, a newer software version with adapted algorithms is tested on the control device. In order to be able to make a statement about the performance of the algorithms in the real world, a very large number of different scenarios and environmental conditions are usually tested all over the world.

For example, sensor data from many vehicles all over the world can be recorded in large-scale endurance runs. These data can be recorded by the respective vehicle, transmitted from there to a server storage facility, and stored there for a correspondingly long time. In addition, the data can be copied for replay and moved within a network. In this way, considerable costs can arise for storing and transporting the data, physically or digitally, which costs are directly related to the volume of data.

The raw sensor data can reach the (object detection) algorithms in the control device via two paths.

On the one hand, the algorithms can receive the raw sensor data directly from the sensor system, for example from a camera. This is the case in real operation of the control device in the vehicle.

On the other hand, the recorded sensor data can be re-fed, which can also be referred to as replaying. In this case, the sensor data can be sent from a framework to a corresponding interface of the control device via a specially developed HIL debug board (HIL=hardware in the loop). The same board can also be used to measure the sensor data.

In the case of re-feeding, the connection to the sensor system is not relevant, since the raw sensor data come directly from the re-feed framework.

As a rule, lossy data compression achieves higher compression rates than lossless data compression, depending on the data loss accepted. In has been shown in experiments that special lossy compression methods optimized for video algorithms do not result in a significant impairment of the detection performance of corresponding video algorithms despite higher compression rates. The use of such compression algorithms in validation is therefore a possible way of further reducing the volume of data. However, the challenge is to ensure that the compression or decompression does not affect the validation data or distort the data compared to the real uncompressed data, since in this case it would not be possible to argue that the tests are representative of the real world. In particular in the case of self-learning algorithms, it would hardly be possible to assess whether the algorithms in all cases behave exactly the same on both data sets and whether the effects of compression make no difference in any case.

The approach according to the present invention described above and below solves this problem by carrying out lossy compression and decompression in the control device itself, for example with the aid of a special hardware module. Not only the real data but also the validation data can thus be recorded in a lossy manner, so that the equality of both is ensured.

For example, for recording and/or evaluation purposes the compressed sensor data can be read directly from the control device. The sensor data provided by the sensor system thus no longer need to be compressed externally and/or, for example, decompressed during re-feeding. In addition, the data traffic between the control device and the peripherals connected thereto is reduced.

During development, the compression can optionally be optimized by using a special HIL debug board (see above) as a data processing device. For example, video streams can thus be recorded in a lossy manner and losslessly at the same time. Due to the possibility of implementation as an FPGA, the development costs can be reduced.

In addition, the HIL debug board can be configured to compare the lossy and the original video streams with each other, for example using a machine-learned algorithm. The quality of the lossy compression can thus be evaluated in parallel with the normal operation of the control device.

The influence of the lossy compression on the detection quality of the respective algorithm can be ascertained by comparing the detection quality that the algorithm achieves in evaluating the original data with that which the algorithm achieves in evaluating the corresponding compressed data.

For the development and release of the lossy compression, the aforementioned HIL debug board can be connected, for example, between the sensor system and the control device. The HIL debug board can, for example, comprise an FPGA on which the aforementioned functions can be correspondingly tested and optimized. It is possible, for example, that the sensor data undergo lossy and lossless compression in parallel. The two compression methods can thus be compared directly with each other. The HIL debug board can, for example, be configured to secure the data integrity of all data paths with CRC32. It can thereby be ensured that the investigated differences in the sensor data are not due to data errors. In addition, the HIL debug board can be configured to cause the original sensor data to be saved when certain triggering conditions are present, for example in the event of emergency braking of the vehicle. The compression can be optimized on the HIL debug board during development.

Detection performance is then evaluated, for example, by a separate re-feeding of the two sensor data sets. The measurement data obtained in this way are compared with one another. For this purpose, the training of the algorithms can take place on the basis of both sensor data sets, i.e., the original and the lossy, decompressed sensor data. A framework can be used for the evaluation, also referred to as the performance evaluation framework or PEF for short, which compares the ground truth data with the respective output data and quantifies deviations.

Alternatively, according to an example embodiment of the present invention, the lossy compression can be applied to already recorded, unchanged sensor data. The resulting lossy data can also be fed in, for example, in an open loop test. With regard to detection performance the resulting output data can then be compared with the original sensor data and/or the ground truth data. This method should be performed several times in order to compensate for system jitter.

In this way, the influence of different compression algorithms on the detection performance of the control device, for example on an object detection algorithm executed by the control device in the form of an artificial neural network, can be evaluated.

The HIL debug board can, for example, comprise an FPGA which can be configured to compare the original and the lossy data streams with one another. For this purpose, the two paths can be processed in the HIL debug board by a corresponding algorithm and then compared. In the case of relevant deviations, additional data can be recorded specifically for further analysis.

It is also advantageous if different image parameters, such as noise or brightness, are adjusted by the decompression. Different uncertainties in the same image can thus be simulated and tested not only during re-feeding but also in the real hardware. The robustness of the video algorithms is thereby increased further.

BRIEF DESCRIPTION OF THE DRAWINGS

Embodiments of the present invention are described below with reference to the figures, and neither the figures nor the description should be construed as limiting the present invention.

The figures are merely schematic and not true to scale. In the figures, identical reference signs refer to identical or identically acting features.

DETAILED DESCRIPTION OF EXAMPLE EMBODIMENTS

Figure 1:
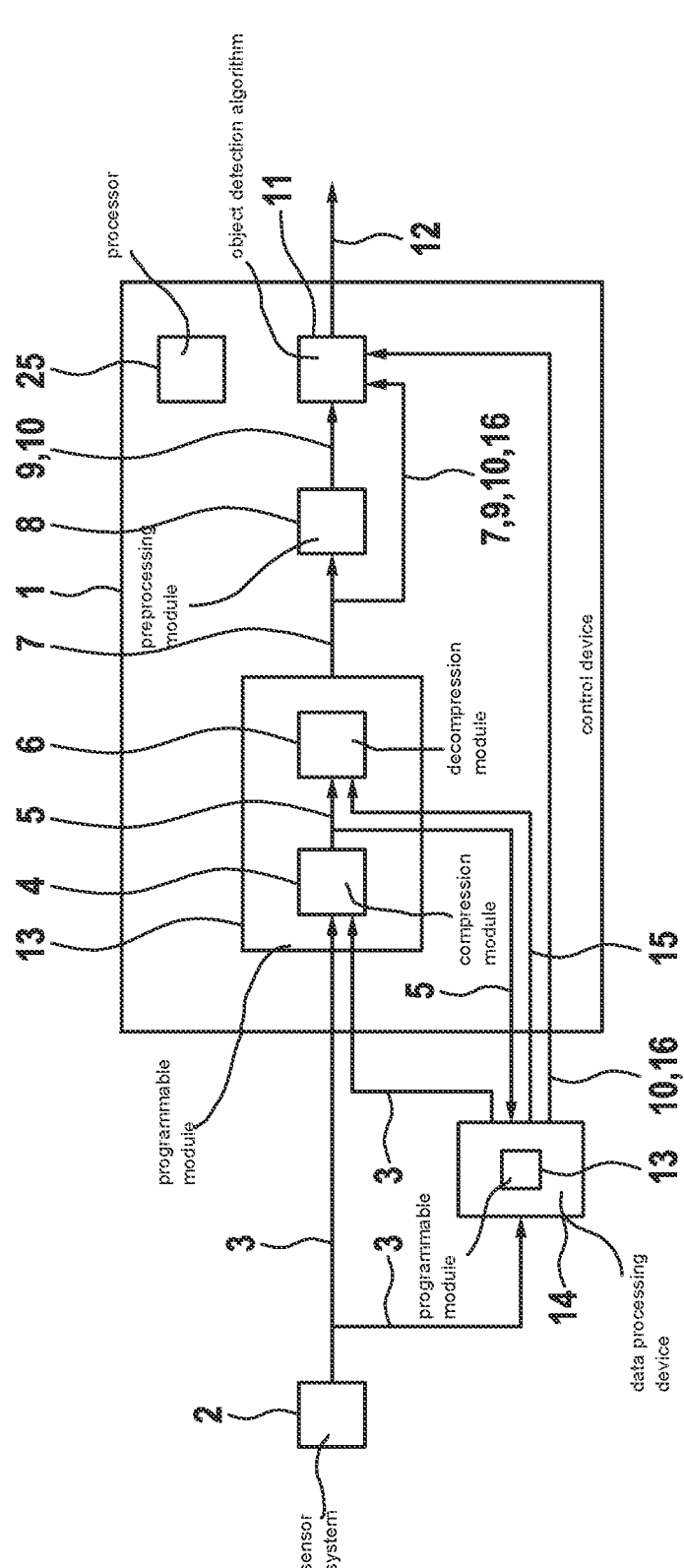
FIG. 1 shows a control device according to an exemplary embodiment of the present invention and a data processing device according to an exemplary embodiment of the present invention.

FIG. 1 shows a control device 1 for a vehicle (not shown). The vehicle is equipped with a sensor system 2 which captures an environment of the vehicle and outputs corresponding sensor data 3 which are received by the control device 1 and processed by means of lossy compression. The sensor system 2 can be a camera, for example. The sensor data 3 can accordingly be image data which can comprise individual images or image sequences of the environment of the vehicle. The sensor system 2 can, for example, also be a radar, lidar or ultrasonic sensor.

In this example, the sensor data 3 are first converted into compressed sensor data 5 by compression using a lossy compression method in a compression module 4. The compressed sensor data 5 are then converted into decompressed raw sensor data 7 by decompression in a decompression module 6.

In a further step, the decompressed raw sensor data 7 are preprocessed in a preprocessing module 8, whereby they are converted into (correspondingly preprocessed) decompressed sensor data 9. The preprocessing module 8 can, for example, be configured to reduce noise in the images or adjust an exposure. Depending on the type of sensor data 3, the preprocessing module 8 can comprise different and/or further preprocessing functions.

The decompressed sensor data 9 are finally input as input data 10 into an object detection algorithm 11, which is configured to convert the input data 10 into output data 12 which display objects detected in the environment of the vehicle, for example pedestrians, road markings, traffic signs or the like, with their respective positions and/or orientations.

Alternatively, the decompression module 6 can transfer the decompressed raw sensor data 7 to the object detection algorithm 11 as the input data 10.

As can be seen in FIG. 1, the compression module 4 and the decompression module 6 can be stored in a separate programmable module 13 of the control device 1, for example an FPGA or an SoC. The object detection algorithm 11 and the preprocessing module 8 can be stored outside this module 13 in the control device 1.

However, it is also possible for the preprocessing module 8 to be integrated into the module 13. In this case, the module 13 can output the decompressed sensor data 9 instead of the decompressed raw sensor data 7 and provide said data to the object detection algorithm 11 as the input data 10. The preprocessing can thus be flexibly adapted to changing boundary conditions, for example to a new sensor system.

For analysis and test purposes, the control device 1 can be connected to an external data processing device 14 via a suitable data communication connection, which can be wireless or wired. The data processing device 14 can be, for example, a PC, laptop, tablet or a special debug board.

For example, the compressed sensor data 5 and/or the output data 12 associated with the compressed sensor data 5 can be sent to the data processing device 14, stored there and evaluated in a suitable manner.

Alternatively, the compressed sensor data 5 can be stored in the control device 1 itself and read there as required.

It is also possible for the data processing device 14 to transmit recorded compressed sensor data 15, which were obtained by recording the compressed sensor data 5, to the control device 1, provided that the latter is operated in a corresponding test mode. The recorded compressed sensor data 15 can be decompressed in the decompression module 6 analogously to the compressed sensor data 5, whereby they are converted into recorded decompressed sensor data 16.

The recorded decompressed sensor data 16 may, for example, have been preprocessed in the module 13 analogously to the decompressed raw sensor data 7. However, preprocessing in the preprocessing module 8 is also possible.

As shown in FIG. 1, depending on the test configuration the sensor data 3 can be received by the data processing device 14 alone or in parallel by the control device 1 and the data processing device 14. In the first case, the data processing device 14 can be connected between the sensor system 2 and the control device 1, wherein the control device 1 receives the sensor data 3 from the data processing device 14.

For example, the sensor data 3 can be compressed in the data processing device 14 in order to obtain the recorded compressed sensor data 15.

It is also possible for the data processing device 14 to convert the recorded compressed sensor data 15 into the recorded decompressed sensor data 16 by compression and to provide said data to the control device 1 as the input data 10 for test purposes as required.

The recorded decompressed sensor data 16 can be used, for example, as training, validation and/or test data for training, validating or testing the object detection algorithm 11 in a machine-learning method.

Figure 2:
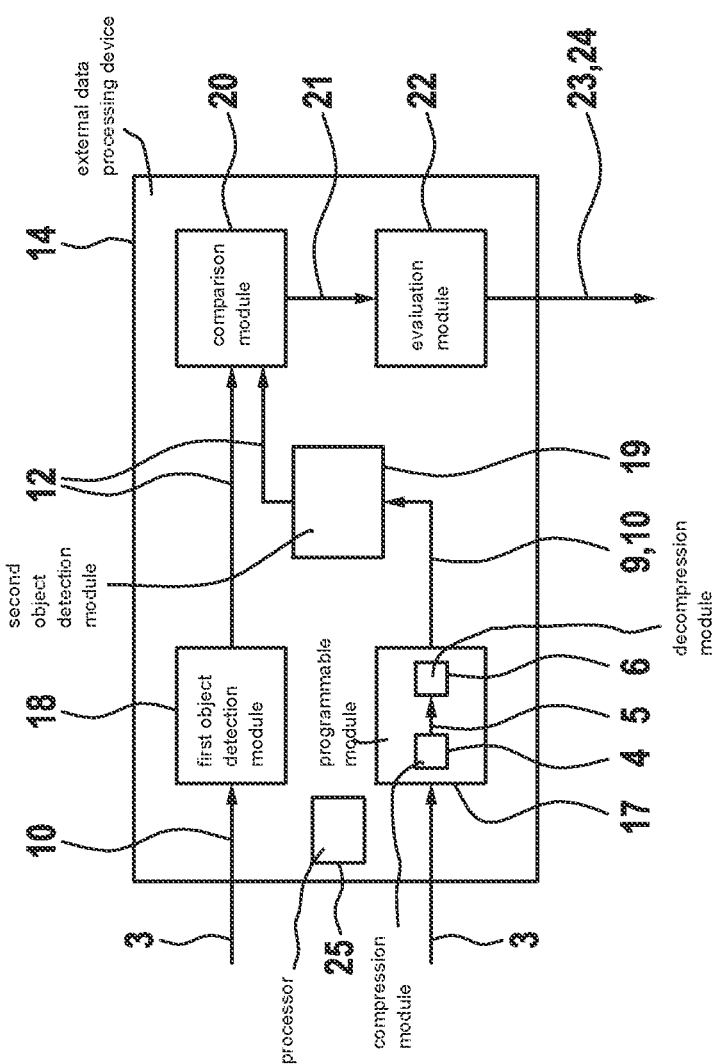
FIG. 2 shows the data processing device from FIG. 1 in detail.

FIG. 2 shows how a lossy compression method, such as is used or is to be used in the control device 1, can be evaluated automatically by the data processing device 14.

For this purpose, the sensor data 3 provided by the sensor system 2 are received in the data processing device 14 and input into a compression module 4, which converts the sensor data 3 into compressed sensor data 5 by compression using the lossy compression method that is to be tested. The compressed sensor data 5 are then input into a decompression module 6 which converts the compressed sensor data 5 by decompression into decompressed sensor data 9.

Alternatively, the data processing device 14 can receive the compressed sensor data 5 from the control device 1.

In this example, the compression module 4 and the decompression module 6 are modules of a further programmable module 17, which has been programmed in the same or a similar manner as the module 13 of the control device 1 or is identical thereto.

The sensor data 3 and the decompressed sensor data 9 are used as input data 10 for a first object detection module 18 or a second object detection module 19 of the data processing device 14, wherein the sensor data 3 are input into the first object detection module 18 and the decompressed sensor data 9 are input into the second object detection module 19. The two object detection modules 18, 19 each execute an object detection algorithm 11, which has been trained with recorded sensor data, in order to convert the input data 10 into output data 12 that display objects in the environment of the vehicle.

The recorded sensor data may have been provided by the sensor system 2 or another sensor system which can be real or simulated.

The object detection algorithm 11 which is executed in the control device 1 can differ from or correspond to the object detection algorithm 11 which is executed in the data processing device 14.

The output data 12 of the two object detection modules 18, 19 are then compared with each other in a comparison module 20 in order to determine a deviation between the respective output data 12.

Finally, a comparison result 21 quantifying the deviation is evaluated in an evaluation module 22 which outputs an evaluation 23, corresponding to the deviation, of the lossy compression method used for the compression of the sensor data 3.

In addition, the evaluation module 22 can be configured to generate, depending on the comparison result 21 and/or the evaluation 23, control commands 24 for starting and/or interrupting a recording of the sensor data 3 provided by the sensor system 2 or of other relevant vehicle data in an internal or external data memory.

The control device 1 and the data processing device 14 are each equipped with a processor 25 which executes a computer program, the execution of which causes the method steps described above using the example of the control device 1 or of the data processing device 14 to be carried out.

In conclusion, it is pointed out that terms like "having," "comprising," etc. do not exclude other elements or steps and terms like "a" or "an" do not exclude a multiplicity. Reference signs are not to be considered as limiting.

The invention claimed is:

1. A method for evaluating a lossy compression method for use in a control device, wherein the method comprises:

receiving sensor data in a data processing device, wherein the sensor data have been provided by a sensor system for capturing an environment of a vehicle;

compressing the sensor data in the lossy compression method to obtain compressed sensor data, and/or receiving compressed sensor data, which have been provided by the control device by compressing the sensor data in the lossy compression method, in the data processing device;

decompressing the compressed sensor data to obtain decompressed sensor data;

inputting the sensor data and the decompressed sensor data as input data into an object detection algorithm, which has been trained with recorded sensor data, in order to convert the input data into output data which display objects in the environment of the vehicle;

determining a deviation between: (i) the output data provided by the object detection algorithm by conversion of the sensor data and (ii) the output data provided by the object detection algorithm by conversion of the decompressed sensor data; and generating an evaluation for the lossy compression method based on the deviation.

2. The method according to claim 1, further comprising:

generating control commands for controlling a recording of the sensor data based on the deviation.

3. A data processing device, comprising:

a processor configured to evaluate a lossy compression method for use in a control device, the processor configured to:

receive sensor data in a data processing device, wherein the sensor data have been provided by a sensor system for capturing an environment of a vehicle, compress the sensor data in the lossy compression method to obtain compressed sensor data, and/or receiving compressed sensor data, which have been provided by the control device by compressing the sensor data in the lossy compression method, in the data processing device, decompress the compressed sensor data to obtain decompressed sensor data, input the sensor data and the decompressed sensor data as input data into an object detection algorithm, which has been trained with recorded sensor data, in order to convert the input data into output data which display objects in the environment of the vehicle, determine a deviation between: (i) the output data provided by the object detection algorithm by conversion of the sensor data and (ii) the output data provided by the object detection algorithm by conversion of the decompressed sensor data, and generate an evaluation for the lossy compression method based on the deviation.

\* \* \* \* \*